US007023183B1

(12) United States Patent
Keller

(10) Patent No.: US 7,023,183 B1
(45) Date of Patent: Apr. 4, 2006

(54) POWER SUPPLY WITH CAPACITIVE MAINS ISOLATION

(75) Inventor: Anton Werner Keller, Arni (CH)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 10/531,119

(22) PCT Filed: Oct. 16, 2003

(86) PCT No.: PCT/IB03/05836

§ 371 (c)(1),
(2), (4) Date: Apr. 11, 2005

(87) PCT Pub. No.: WO2004/036330

PCT Pub. Date: Apr. 29, 2004

Related U.S. Application Data

(60) Provisional application No. 60/418,823, filed on Oct. 16, 2002.

(51) Int. Cl.
*G05F 1/10* (2006.01)

(52) U.S. Cl. ............... 323/222; 323/285; 323/290; 363/21.02

(58) Field of Classification Search .......... 323/222, 323/225, 232, 246, 284, 285, 290; 363/21.02, 363/95, 97, 131

See application file for complete search history.

(56) References Cited

U.S. PATENT DOCUMENTS 5,583,421 A * 12/1996 Barbehenn et al. ......... 323/222

(Continued)

FOREIGN PATENT DOCUMENTS

EP    0696841    2/1996

OTHER PUBLICATIONS

M. Brkovic; S. Cuk, California Inst. of Technol., Pasadena, CA US, "Automatic current shaper with fat output regulation and soft-switching" Telecommunications energy conference, 1993, vol. 1, Sep. 27, 1993.

(Continued)

*Primary Examiner*—Jessica Han
(74) *Attorney, Agent, or Firm*—Joseph S. Tripoli; Harvey D. Fried; Christine Johnson

(57) ABSTRACT

A power supply with capacitive mains isolation, comprises a source of an input supply voltage developed between a first terminal and a second terminal. A first supply inductance is coupled to the first terminal, and a second supply inductance is coupled to a load circuit. A switch responsive to a periodic control signal applies the input supply voltage to the first supply inductance to generate a current in the first supply inductance at a first polarity, during a first portion of a period of the control signal when the switch is at a first switch state. A pair of capacitors operate to couple the first supply inductance to the second supply inductance during a second portion of the period of the control signal when the switch is at a second switch state. The pair of capacitors isolate the first and second terminals, respectively, from the second supply inductance at a range of frequencies that is lower than a frequency of the control signal. A first rectifier is coupled to the first supply inductance for preventing the first supply inductance current from changing polarity, during the second portion of the period.

15 Claims, 3 Drawing Sheets

U.S. PATENT DOCUMENTS 5,642,267 A    6/1997    Brkovic et al.
6,343,027 B1 *  1/2002    Kerwin ........................ 363/95
6,608,770 B1 *  8/2003    Vinciarelli et al. ......... 323/222

OTHER PUBLICATIONS

M.T. Madigan, R.W. Erikson; E.H. Ismail, Unitrod Corp, Cary,NC US "Integrated High-Quality Rectifier-Regulator" Insustrial Electronics, IEEE Transactions, vol. 46, Aug. 1999, pp. 749-758.

Copy of Search Report Dated Jul. 6, 2004.

* cited by examiner

POWER SUPPLY WITH CAPACITIVE MAINS ISOLATION

RELATED APPLICATIONS

This application claims the benefit, under 35 U.S.C. § 365 of International Application PCT/IB03/005836, filed Oct. 16, 2003, which was published in accordance with PCT Article 21(2) on Apr. 29, 2004 in English and which claims the benefit of U.S. provisional patent application No. 60/418,823, filed Oct. 16, 2002.

FIELD OF THE INVENTION

The present invention relates to power supplies in general, and more particularly, to generating a supply voltage using capacitive isolation.

BACKGROUND OF THE INVENTION

Power supplies serve the purpose of converting an input voltage into one or several output voltages. An AC power source may be used to provide an AC power line input, which gets converted to a DC regulated output voltage. Transformers are typically used to provide isolation for a power supply or a converter. However, transformers are typically large in size (due to the size of the magnetic elements within them), bulky and expensive devices. A regulated power supply that utilizes capacitive elements to transform an input voltage from an AC power source to a specified output voltage level across a load is desired.

SUMMARY OF THE INVENTION

A power supply with capacitive mains isolation, comprises a source of an input supply voltage developed between a first terminal and a second terminal. A first supply inductance is coupled to the first terminal, and a second supply inductance is coupled to a load circuit. A switch responsive to a periodic control signal applies the input supply voltage to the first supply inductance to generate a current in the first supply inductance at a first polarity, during a first portion of a period of the control signal when the switch is at a first switch state. A pair of capacitors operate to couple the first supply inductance to the second supply inductance during a second portion of the period of the control signal when the switch is at a second switch state. The pair of capacitors isolate the first and second terminals, respectively, from the second supply inductance at a range of frequencies that is lower than a frequency of the control signal. A first rectifier is coupled to the first supply inductance for preventing the first supply inductance current from changing polarity, during the second portion of the period.

DETAILED DESCRIPTION

Figure 1:
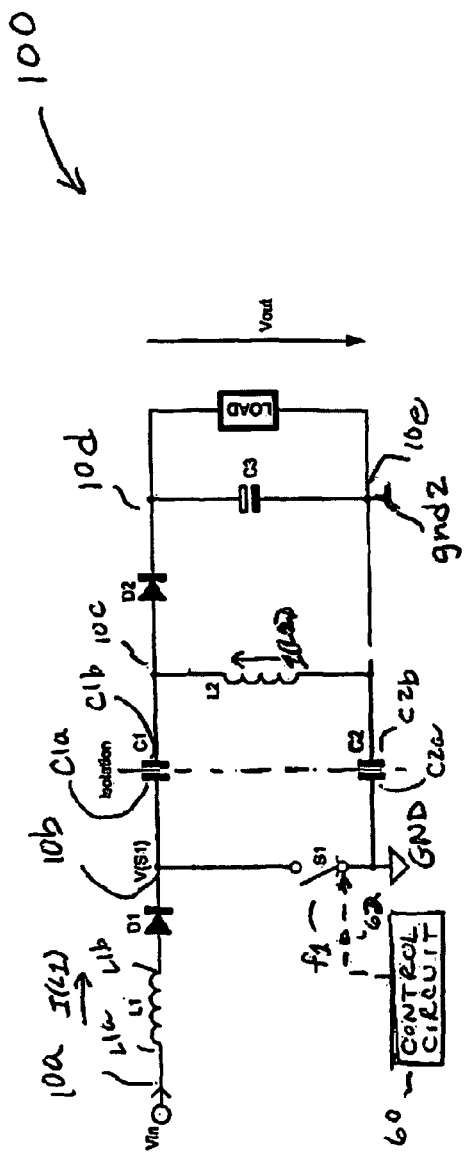
FIG. 1 shows a power supply with capacitive mains isolation in accordance with an embodiment of the present invention.

FIG. 1 depicts an exemplary circuit arrangement 100 adapted to provide a power supply having capacitive mains isolation according to an embodiment of the present invention. An input supply voltage Vin is developed and applied at input node 10a of circuit 100. Inductor L1 and diode D1 are connected in series with one another, with L1 having a first terminal L1a connected to node 10a, and a second terminal L1b connected to the anode of diode D1. The cathode of diode D1 is connected at node 10b to terminal C1a of first isolation capacitor C1, whose second terminal C1b is connected to node 10c. Switch S1 selectively provides a direct path between node 10b and reference potential or ground (GND). Isolation capacitor C2 has a first terminal connected to GND and a second terminal connected to C1 through inductor L2. Capacitors C1 and C2 provide isolation due to the fact that the capacitors have a high impedance at the relatively low frequency of Vin. However, the capacitors represent a low impedance at the frequency of operation of switch S1, which is at a higher frequency than that of Vin. Switch S1 is responsive to a control signal 62 from control circuit 60 for selectively opening/closing the connection between node 10b and GND to disable/enable application of the input supply voltage Vin to inductor L1. In this manner the switch is operated at a given frequency f1 in accordance with the control signal. Capacitors C1 and C2 have low impedance with respect to this frequency. For example, capacitors C1 and C2 may have a low impedance in relation to operation of switch S1 at 50 KHz, while providing a high impedance and isolation at an input voltage Vin of, for example 50 Hz or 60 Hz. While switch S1 is shown as a simple switch, it is understood that various implementations are possible, such as one or more switching transistors, relays, solenoids, and the like.

Still referring to FIG. 1, diode D2 is connected between nodes 10c and 10d, while load RL and filter capacitor C3 are connected in parallel between nodes 10d and 10e. Isolation capacitor C2 has a first terminal C2a coupled to GND, and a second terminal C2b coupled to node 10e. Inductor L2 is connected between node 10c and 10e. Node 10e is connected to a second reference or isolated ground potential gnd2.

Figure 2:
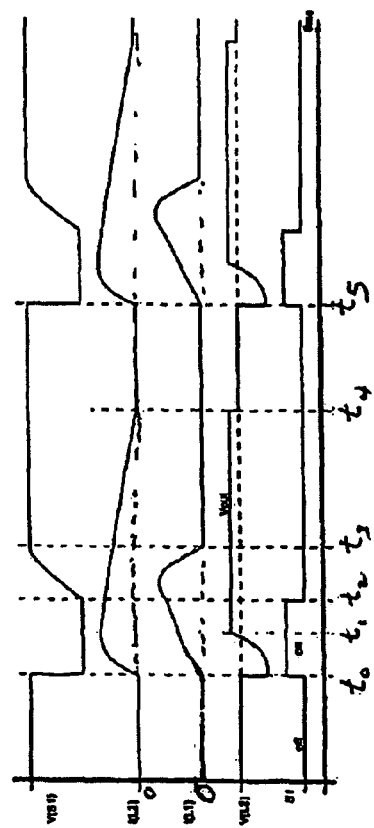
FIG. 2 shows waveforms associated with the operation of the circuit shown in FIG. 1.

Operation of power supply circuit 100 is described with reference to FIG. 1 in conjunction with the respective waveforms shown in FIG. 2. Initially (i.e. time t0), switch S1 is closed ("on") to cause current I(L1) to rise linearly and store energy in inductor L1. At the same time a sinusoidal current I(L2) begins to transfer the stored energy of C1 and C2 to L2. When the voltage across capacitor C1 exceeds the output voltage (Vout) at time t1, diode D2 conducts and the energy in inductor L2 is transferred to capacitor C3. Note that between time t0 and time t1, current flows in the path of circuit elements L2, C1, S1 and C2 (in the counterclockwise direction). At time t1, the path of current changes to flow in the clockwise direction through circuit elements L2, D2 and C3. This is because the voltage across C1 and C2 equals the voltage across C3 (i.e. Vout). At time t2, S1 is switched "off" (i.e. opened). Current I(L1) continues to flow through the circuit elements D1, C1, D2, C3 and C2 back to the mains until the energy stored in L1 is transferred to C1, C2 and C3. At time t2, current I(L1) slightly increases due to the condition that Vin is higher than the voltage V(S1) at node 10b. During this energy transfer, diode D1 embodying an inventive feature is conducting in the forward direction. As soon as the current in L1 drops to zero at time t3 (due to resonance with C1, C2, C3) diode D1 changes to a nonconductive state and the current I(L1) is maintained at zero. A flow back of energy from C1, C2 back to L1 (oscillation) is thereby advantageously suppressed. Diode D1 advantageously increases the efficiency of the circuit since the entire energy is thereby stored in C1 and C2. Diode D1 allows the use of a free-running oscillator for controlling S1. At time t4, the energy in L2 is completely transferred into C3. The time interval between t4 and t5 is a "dead time" and can be varied to regulate the transfer of power between the input and output terminals. Note that when S1 is again turned "on" (e.g. at time t5), current I(L1) again rises linearly, and the above described sequence is repeated.

Figure 3:
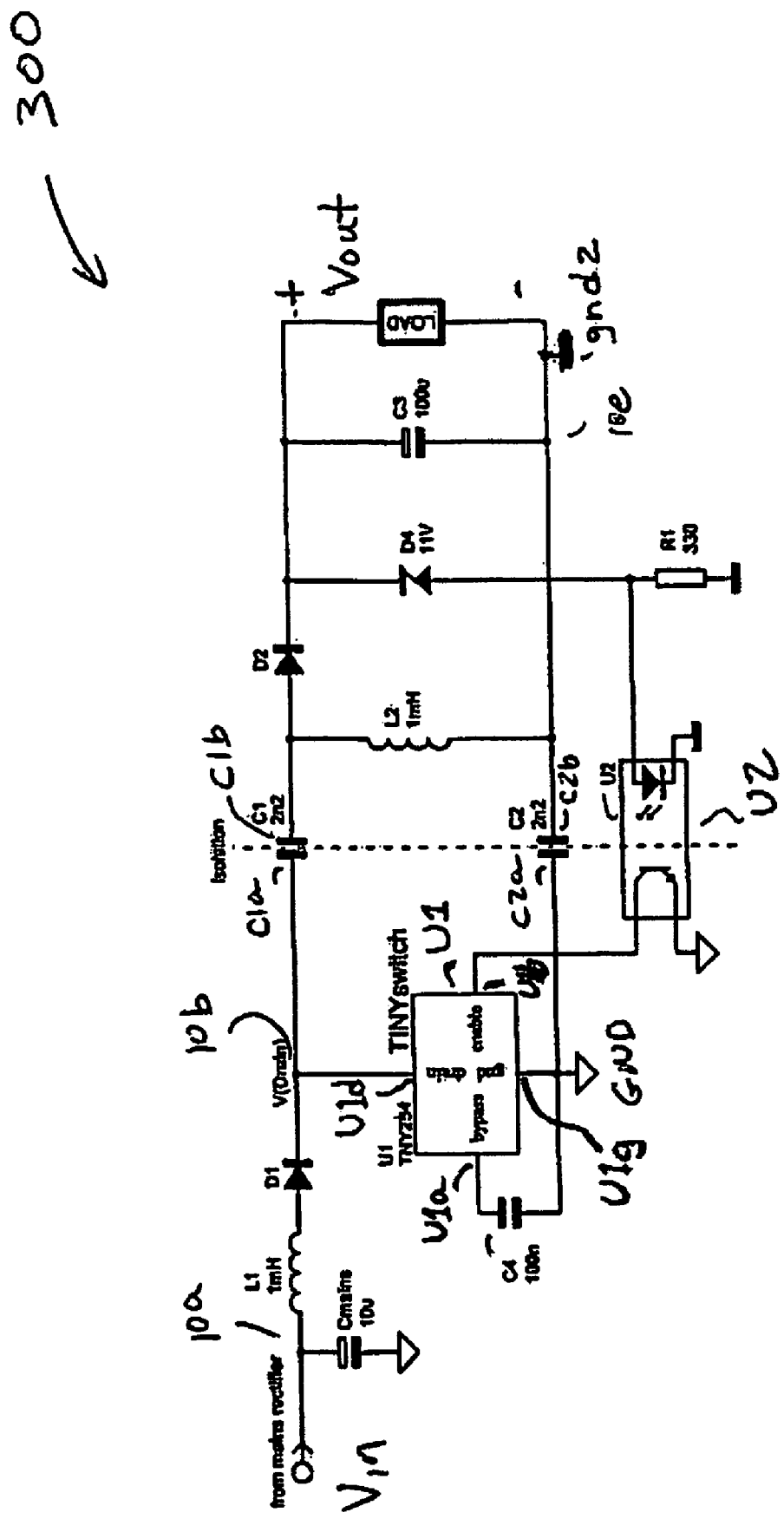
FIG. 3 shows a standby power supply with capacitive mains isolation in accordance with another embodiment of the present invention.
Figure 4:
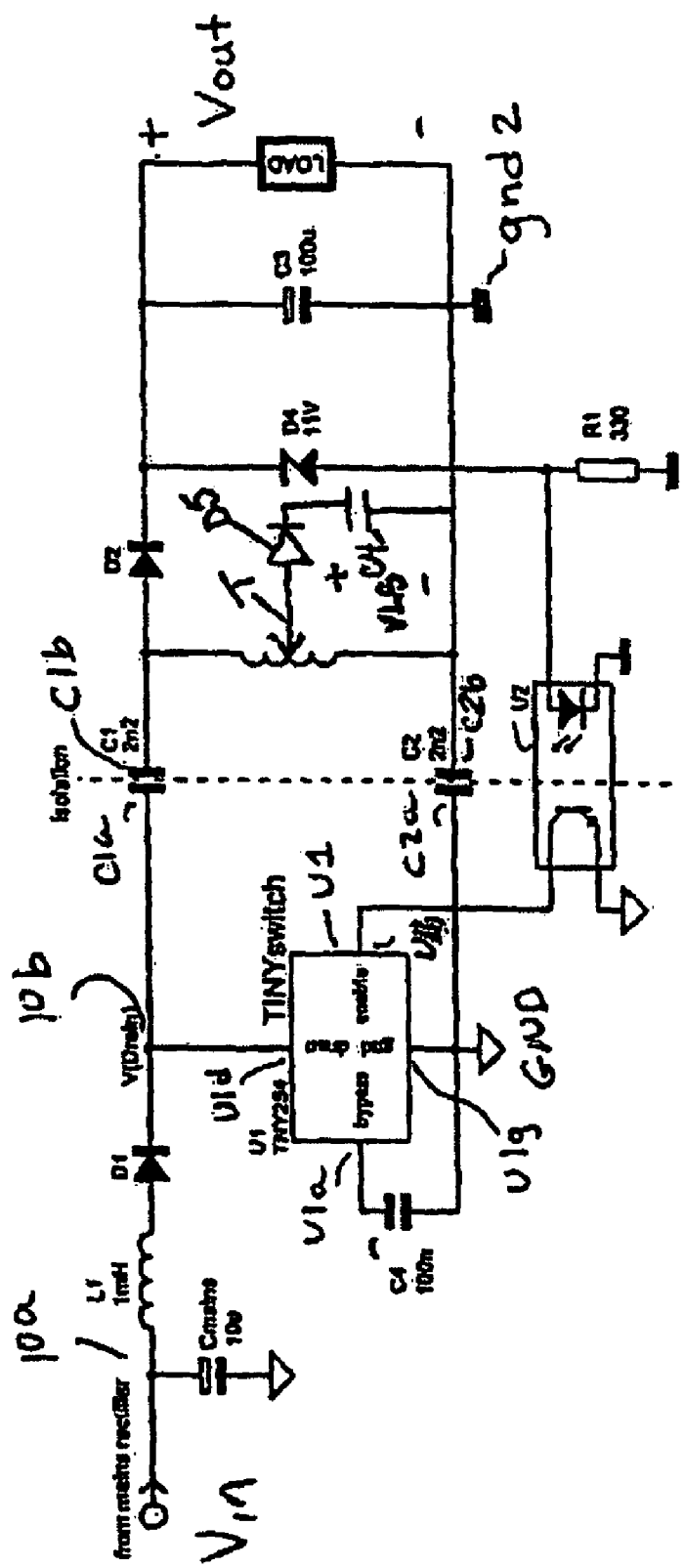
FIG. 4 shows a standby power supply with capacitive mains isolation including a mechanism for providing a lower output voltage in accordance with another embodiment of the present invention.

FIG. 3 illustrates an exemplary embodiment of a standby power supply having capacitive mains isolation according to the present invention. A control unit U1 such as a standard SMPS controller, is connected between nodes 10b and GND via terminals U1d and U1g, respectively, and further includes a supply terminal U1a and feedback terminal U1b. U1a is the supply terminal where the internal supply voltage of the integrated circuit (internal to U1) is developed. More particularly, the supply terminal U1a is energized internally in the IC in a manner not shown. Bypass capacitor C4 is connected between supply terminal U1a and GND for providing power from integrated circuit U1, while terminal U1b is connected to coupler U2, which may be an optocoupler, for example. In an exemplary embodiment, control unit U1 operates at a constant frequency, such as 50 Kilohertz (50 KHz) and includes an internal startup or initialization circuit. Voltage regulation is realized by operating the control unit in an on/off mode or burst mode. When the output voltage Vout exceeds the voltage reference level of Zener diode D4 which is connected to secondary ground gnd2 by resistor RI, the controller is switched off via opto-coupler U2. A decreasing output voltage turns the controller on again. Note that L2 can be provided with a tap T as shown in FIG. 4, in the event that a second, lower output voltage is desired. As illustrated in the embodiment of FIG. 4, tap T is connected to inductor L2, and to capacitor C4 via diode D5 to secondary ground gnd2. Note that the output voltage VLS is provided by the ratio of the turns of the inductor L2.

Although the invention has been described in terms of exemplary embodiments, it is not limited thereto. The appended claims should be construed broadly to include other variants and embodiments of the invention which may be made by those skilled in the art without departing from the scope and range of equivalents of the invention.

The invention claimed is:

1. A power supply comprising:
a source of an input supply voltage developed between a pair of input supply terminals;
a first supply inductance;
a switch responsive to a periodic control signal for producing from said input supply voltage a periodic current at a first frequency in said first supply inductance that is non-isolated from each of said first pair of terminals;
a pair of capacitors coupled in a current path of said first supply inductance current for developing an output supply between a pair of output supply terminals that are coupled to a load, said pair of capacitors providing capacitive isolation of said output supply terminals from said input supply terminals, respectively, at frequencies lower than said first frequency and form with said first supply inductance a first resonant circuit that varies said first supply inductance current in a resonant manner operation, during a first portion of a period of said first supply inductance current; and
a first rectifier coupled in said current path for preventing the first supply inductance current variation from resulting in a polarity change of said first supply inductance current, during said first period portion.

2. The power supply according to claim 1, further comprising a second supply inductance coupled between said pair of capacitors, wherein said first supply inductance current charges said pair of capacitors in a first direction, during said first portion period, and wherein said second supply inductance forms with said pair of capacitors a second resonant circuit for charging said pair of capacitors in an opposite direction, during a second portion of said period.

3. The power supply according to claim 2, wherein said switch is at a first state, during said first period portion, and at a second state, during said second period portion.

4. The power supply according to claim 2, further comprising a second rectifier for rectifying a voltage developed in said second supply inductance to develop a rectified output supply voltage in said load.

5. The power supply according to claim 4, further comprising a filter capacitor for said rectified output supply voltage to form a low impedance path between said pair of capacitors, during said first portion of said period.

6. The power supply of claim 1, wherein the first rectifier comprises a diode having a first terminal connected to the first inductance, and a second terminal connected to one of the pair of capacitors.

7. The power supply of claim 6, further comprising a second rectifier coupled between the first one of the capacitors and the load.

8. The power supply of claim 1, wherein the periodic control signal is produced from an oscillator circuit coupled to the switch.

9. The power supply of claim 1, wherein the switch comprises a switching transistor.

10. The power supply of claim 1, further comprising a third capacitor connected in parallel with the load.

11. The power supply of claim 1, wherein the periodic control signal is produced from a control circuit coupled to the switch and operated in one of an on/off and burst mode of operation.

12. The power supply of claim 11, wherein an optocoupler is connected to the control circuit such that when an output voltage across the load exceeds a reference voltage, the controller is switched off via the opto-coupler.

13. The power supply of claim 12, further comprising a diode in parallel with the load for sensing when an output voltage across the load exceeds the reference voltage.

14. The power supply of claim 1, further comprising a second supply inductance coupled between said pair of capacitors and a tap coupled to a second supply inductance for providing a second lower output supply voltage.

15. A power supply, comprising:
a source of an input supply voltage developed between a pair of input supply terminals;
a first supply inductance;
a switch responsive to a periodic control signal for producing from said input supply voltage a periodic current at a first frequency in said first supply inductance that is non-isolated from each of said first pair of terminals;

a second supply inductance;

a pair of capacitors coupled in series with said first supply inductance, during a first portion of a period of said control signal, and having said second supply inductance coupled between said capacitors for developing from a voltage produced in said second supply inductance an output supply between a pair of output supply terminals of a load, said pair of capacitors providing capacitive isolation of said output supply terminals from said input supply terminals at frequencies lower than said first frequency; and a first rectifier coupled in series with said first supply inductance for preventing said first supply inductance current from changing polarity.

* * * * *